United States Patent
Lim et al.

(10) Patent No.: US 11,088,549 B2
(45) Date of Patent: Aug. 10, 2021

(54) MULTIPLE CHARGERS CONFIGURATION IN ONE SYSTEM

(71) Applicant: INTERSIL AMERICAS LLC, Milpitas, CA (US)

(72) Inventors: Sungkeun Lim, Cary, NC (US); Lei Zhao, Cary, NC (US); Mehul Shah, Cary, NC (US); Jia Wei, Cary, NC (US)

(73) Assignee: Intersil Americas LLC, Milpitas, CA (US)

( * ) Notice: Subject to any disclaimer, the term of this patent is extended or adjusted under 35 U.S.C. 154(b) by 104 days.

(21) Appl. No.: 15/396,264

(22) Filed: Dec. 30, 2016

(65) Prior Publication Data
US 2017/0279284 A1 Sep. 28, 2017

Related U.S. Application Data

(60) Provisional application No. 62/311,786, filed on Mar. 22, 2016, provisional application No. 62/362,424, filed on Jul. 14, 2016.

(51) Int. Cl.
*H02J 7/00* (2006.01)
*B60L 53/24* (2019.01)
(Continued)

(52) U.S. Cl.
CPC .......... *H02J 7/0024* (2013.01); *H02J 7/0045* (2013.01); *H02J 7/0068* (2013.01); *B60L 53/11* (2019.02);
(Continued)

(58) Field of Classification Search
CPC ........ H02J 7/0052; H02J 7/0068; H02J 7/022; H02J 2007/0059
(Continued)

(56) References Cited

U.S. PATENT DOCUMENTS 7,772,818 B2 * 8/2010 Smith .................. G01R 19/003
323/282
7,777,455 B1 * 8/2010 Martin .................. H02J 7/0055
320/137
(Continued)

FOREIGN PATENT DOCUMENTS

TW 201230591 A 7/2012

OTHER PUBLICATIONS

IOTA Power Products Technical Library: Sep. 19, 2013, "Best Solutions for Series and Parallel Charger Installations. Utilizing multiple chargers for increasing voltage or amperage", pp. 1-4.
(Continued)

*Primary Examiner* — David V Henze-Gongola
*Assistant Examiner* — Tarikh Kanem Rankine
(74) *Attorney, Agent, or Firm* — Foley & Lardner LLP

(57) ABSTRACT

An electronic system, a multiple charger configuration, and method of operating a multiple input, multiple charger configuration are disclosed. For example, a multiple charger configuration is disclosed, which includes a first battery charger circuit configured to receive to a first input voltage, and a second battery charger circuit configured to receive a second input voltage. A first switching transistor is coupled to an output of the first battery charger circuit, a system voltage output terminal, and a battery terminal configured to connect to a battery stack or at least one battery cell. A second switching transistor is coupled to an output of the second battery charger circuit and the battery terminal. Thus, the multiple chargers can be utilized in one system to charge or discharge a battery stack or at least one battery cell and thereby deliver power for a battery-operated system, product or device.

20 Claims, 10 Drawing Sheets

(51) Int. Cl.
  *B60L 53/10* (2019.01)
  *H02J 9/06* (2006.01)
  *B60L 53/14* (2019.01)
  *B60L 53/16* (2019.01)

(52) U.S. Cl.
  CPC .............. *B60L 53/14* (2019.02); *B60L 53/16* (2019.02); *B60L 53/24* (2019.02); *B60L 2210/40* (2013.01); *B60L 2220/14* (2013.01); *B60L 2220/16* (2013.01); *H02J 7/007* (2013.01); *H02J 9/062* (2013.01); *H02J 2207/20* (2020.01)

(58) Field of Classification Search
  USPC ........................................................ 320/107
  See application file for complete search history.

(56) References Cited

U.S. PATENT DOCUMENTS

| | | | |
|---|---|---|---|
| 8,018,212 B1 | 9/2011 | Petricek | |
| 8,102,162 B2 | 1/2012 | Moussaoui et al. | |
| 8,698,351 B2* | 4/2014 | Castelaz | H02J 4/00 307/25 |
| 8,860,396 B2* | 10/2014 | Giuliano | H02M 3/07 323/288 |
| 9,218,043 B2 | 12/2015 | Wei et al. | |
| 9,246,348 B2 | 1/2016 | Solie | |
| 9,821,668 B2* | 11/2017 | Kusch | B60L 58/26 710/313 |
| 9,969,290 B2* | 5/2018 | Tang | B60L 3/003 |
| 2004/0145843 A1* | 7/2004 | Winick | H03K 17/302 361/90 |
| 2005/0242772 A1 | 11/2005 | Cha | |
| 2005/0280392 A1 | 12/2005 | Nguyen | |
| 2006/0103344 A1 | 5/2006 | Hassan et al. | |
| 2006/0181244 A1 | 8/2006 | Luo et al. | |
| 2007/0188134 A1* | 8/2007 | Hussain | H01M 10/44 320/114 |
| 2008/0013351 A1* | 1/2008 | Alexander | H02M 3/1582 363/123 |
| 2008/0055940 A1* | 3/2008 | Lawson | H02M 1/10 363/16 |
| 2008/0100143 A1* | 5/2008 | Lipcsei | H02J 7/0068 307/80 |
| 2008/0116854 A1 | 5/2008 | Park | |
| 2008/0191555 A1 | 8/2008 | Cha | |
| 2008/0238205 A1* | 10/2008 | Lee | H02J 9/061 307/66 |
| 2008/0266917 A1* | 10/2008 | Lin | H02M 3/07 363/80 |
| 2009/0027013 A1 | 1/2009 | Odaohhara | |
| 2009/0033293 A1* | 2/2009 | Xing | H02J 7/0077 320/164 |
| 2009/0044026 A1* | 2/2009 | Li | G06F 1/263 713/300 |
| 2009/0115374 A1* | 5/2009 | Noda | H02J 1/10 320/138 |
| 2009/0140698 A1 | 6/2009 | Eberhard et al. | |
| 2010/0194344 A1* | 8/2010 | Greyling | H02M 3/157 320/128 |
| 2010/0264893 A1* | 10/2010 | Li | H02J 1/10 323/282 |
| 2010/0289457 A1 | 11/2010 | Onnerud et al. | |
| 2011/0140649 A1* | 6/2011 | Choi | H01M 14/005 320/101 |
| 2011/0148360 A1* | 6/2011 | Lee | H02J 7/35 320/134 |
| 2011/0156655 A1* | 6/2011 | Kim | H01M 10/441 320/134 |
| 2011/0227531 A1 | 9/2011 | Rajakaruna | |
| 2012/0112693 A1* | 5/2012 | Kusch | B60L 58/20 320/109 |
| 2012/0151240 A1* | 6/2012 | Robinson | H02J 5/00 713/340 |
| 2013/0009470 A1 | 1/2013 | Chuang et al. | |
| 2013/0082643 A1 | 4/2013 | Cha | |
| 2013/0086409 A1 | 4/2013 | Lu et al. | |
| 2013/0106195 A1* | 5/2013 | Kusch | H02J 7/1423 307/82 |
| 2013/0154550 A1* | 6/2013 | Balmefrezol | G06F 1/263 320/107 |
| 2014/0035530 A1 | 2/2014 | Shao | |
| 2014/0084862 A1 | 3/2014 | Kawaguchi et al. | |
| 2014/0101463 A1* | 4/2014 | Ju | G06F 1/26 713/300 |
| 2014/0111139 A1 | 4/2014 | Chen et al. | |
| 2014/0167694 A1 | 6/2014 | Gjinali et al. | |
| 2014/0210400 A1* | 7/2014 | Goncalves | H02J 7/0029 320/107 |
| 2014/0222271 A1 | 8/2014 | Merten et al. | |
| 2014/0266011 A1* | 9/2014 | Mehta | H02M 3/1584 320/107 |
| 2014/0327306 A1 | 11/2014 | Inoue | |
| 2014/0347003 A1* | 11/2014 | Sporck | H02J 7/022 320/107 |
| 2015/0069956 A1* | 3/2015 | Hu | H02J 7/0052 320/107 |
| 2015/0069970 A1 | 3/2015 | Sarkar et al. | |
| 2015/0134980 A1 | 5/2015 | Chen et al. | |
| 2015/0137754 A1* | 5/2015 | Yang | H02J 7/022 320/109 |
| 2016/0087472 A1* | 3/2016 | Sattinger | H02J 7/0055 320/108 |
| 2016/0202743 A1* | 7/2016 | Li | G06F 1/26 710/313 |
| 2016/0352101 A1* | 12/2016 | Koo | H02J 1/12 |
| 2016/0380455 A1* | 12/2016 | Greening | H02J 7/0044 320/114 |
| 2017/0366079 A1* | 12/2017 | Bhowmik | H02J 3/46 |
| 2018/0034269 A1* | 2/2018 | Adest | H02J 3/383 |
| 2018/0323725 A1* | 11/2018 | Cox | H02M 1/088 |

OTHER PUBLICATIONS

Linear Technology Corporation: "LT3790 60V Synchronous 4-Switch Buck-Boost Controller", 2014, pp. 1-28.
Morningstar Corp: http://www.morningstarcorp.com/parallel-charging-using-multiple-controllers-separate-pv-arrays/, Mar. 18, 2016 "Parallel Charging Using Multiple Controllers With Separate PV Arrays", pp. 1-7.
Morningstar Corp: 2013, "DIAGRAM: Paralleling. Parallel Charging with 2 or more Controllers v01", pp. 1-2.
Orion BMS: 2015, http://www.orionbms.com/charger-integration/multiple-chargers-parallel, "AN2450 Using Multiple Chargers in Parallel", pp. 1-4.
EDN Netowrk: Szolusha, May 18, 2015, "Parallel Operation Minimizes Temperature Rise in Synchronous 4-Switch Buck-Boost Converters", pp. 1-6.
Torex: www.torex.co.jp, Apr. 26, 2012, "A New Method to Parallel Two Supplies", pp. 1-4.
Xantrex, http://www.xantrex.com/power-products/battery-chargers/truecharge-2-2.aspx, Mar. 28, 2016, "Battery Chargers TRUECharge2 (20A, 40A, & 60A) New Generation", pp. 1-3.
"1-4 Cell Li Battery SMBus Change Controller for Supporting Turbo Boost Mode with N-Channel Power MOSFET Selector", Texas Instruments, Sep. 2011, Revised Jan. 2013, 42 pages.
"2-4 Cell Li Battery SMBus Charge Controller with N-Channel Power MOSFET Selector and Advanced Circuit Protection", Texas Instruments, Jul. 2010, Revised Nov. 2010, 40 pages.
"Narrow VDC Regulator/Charger with SMBus Interface", Intersil, FN6773.3, Mar. 1, 2012, 32 pages.
Foreign Action other than Search Report on TW 106107556 dated Jun. 17, 2021.

* cited by examiner

MULTIPLE CHARGERS CONFIGURATION IN ONE SYSTEM

CROSS-REFERENCE TO RELATED APPLICATIONS

This application is related to, and claims the benefit of, U.S. Provisional Patent Application Ser. No. 62/311,786 entitled "TWO CHARGERS CONFIGURATION IN ONE SYSTEM," filed on Mar. 22, 2016, and to U.S. Provisional Patent Application Ser. No. 62/362,424 entitled "TWO CHARGERS CONFIGURATION IN ONE SYSTEM," filed on Jul. 14, 2016, both of which are incorporated herein by reference. This application hereby claims to the benefit of U.S. Provisional Patent Application Ser. Nos. 62/311,786 and 62/362,424.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings.

DETAILED DESCRIPTION

Figure 1A:
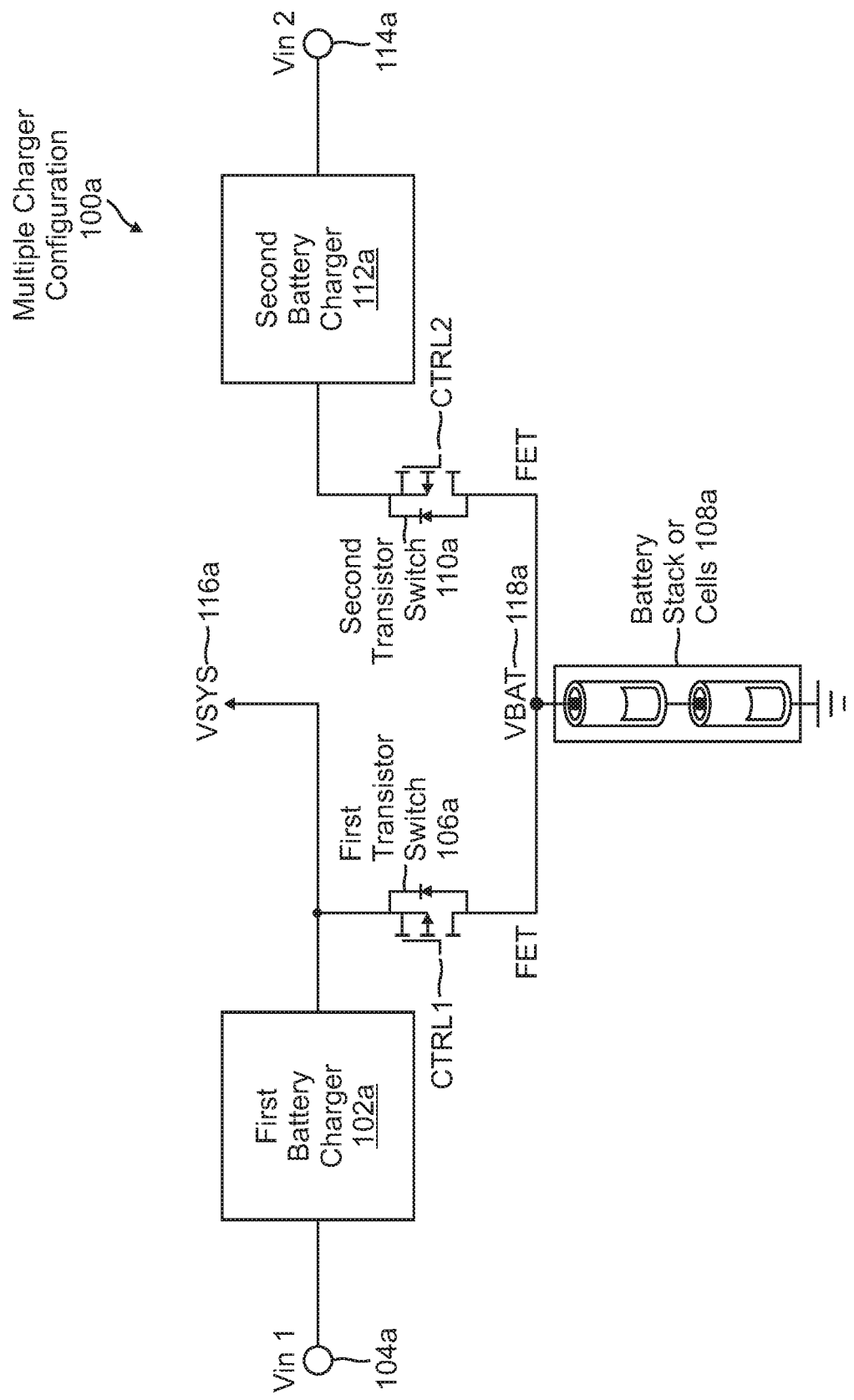
FIGS. 1A-1D are related schematic circuit diagrams of a multiple charger configuration that can be utilized to implement one exemplary embodiment of the present invention.

In the following detailed description, reference is made to the accompanying drawings that form a part hereof, and in which are shown by way of specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be construed in a limiting sense. Wherever possible, the same or like reference numbers are used throughout the drawings to refer to the same or like structural components or parts.

Many manufacturers of mobile or other battery-operated products or devices with battery chargers such as, for example, notebooks, laptops, personal computers, tablets, smart phones, digital cameras, battery banks and the like, have identified the need for the use of multiple input sources for the product or device systems involved. For example, if each input source could be connected to a different battery charger and the multiple chargers utilized together to charge the battery, then that capability would negate the need for complicated input power selection circuitry, and also significantly increase the battery charging speed. As described below, the present invention provides such a capability with a multiple input, multiple battery charger configuration for each single system involved.

Figure 1B:
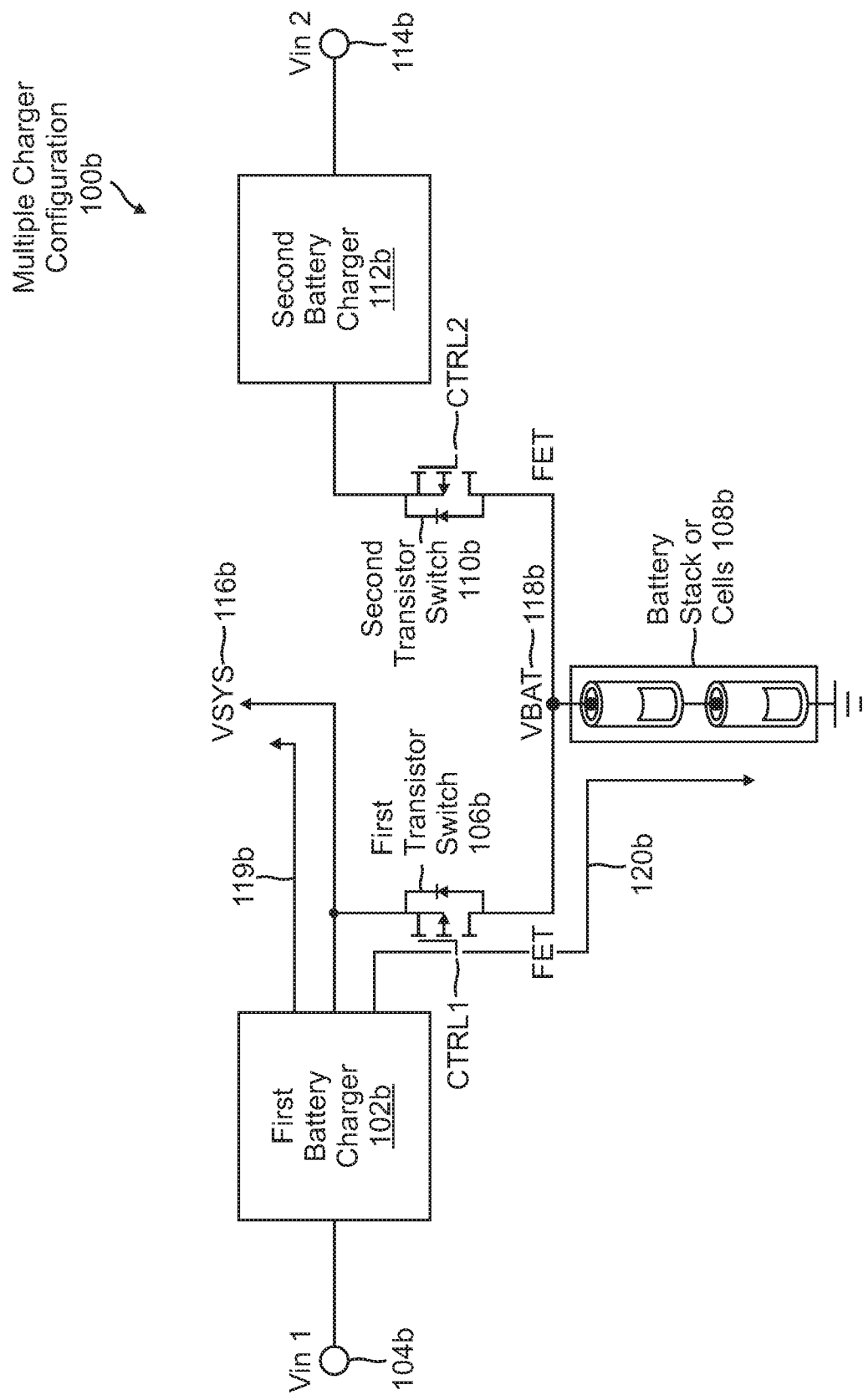
Figure 1C:
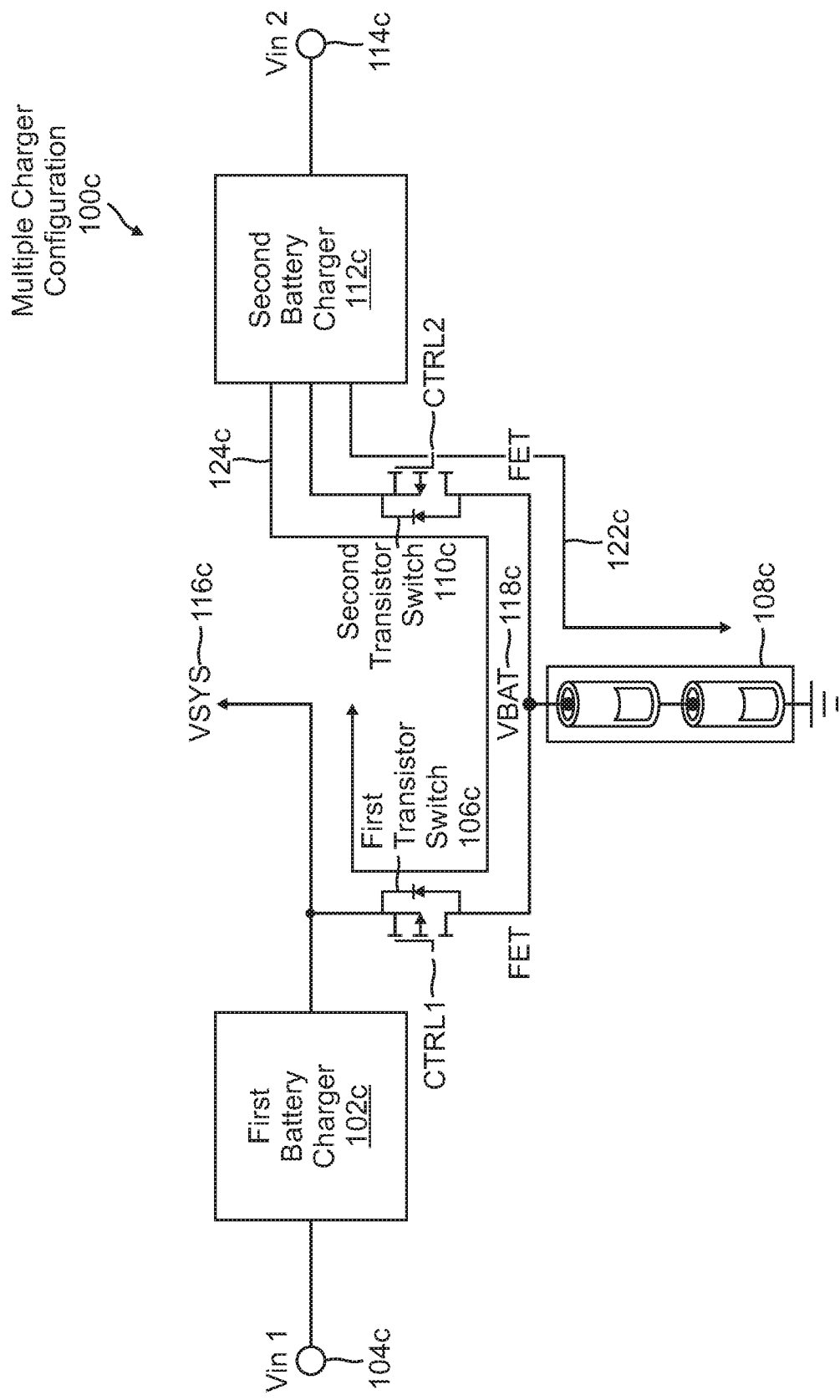
Figure 1D:
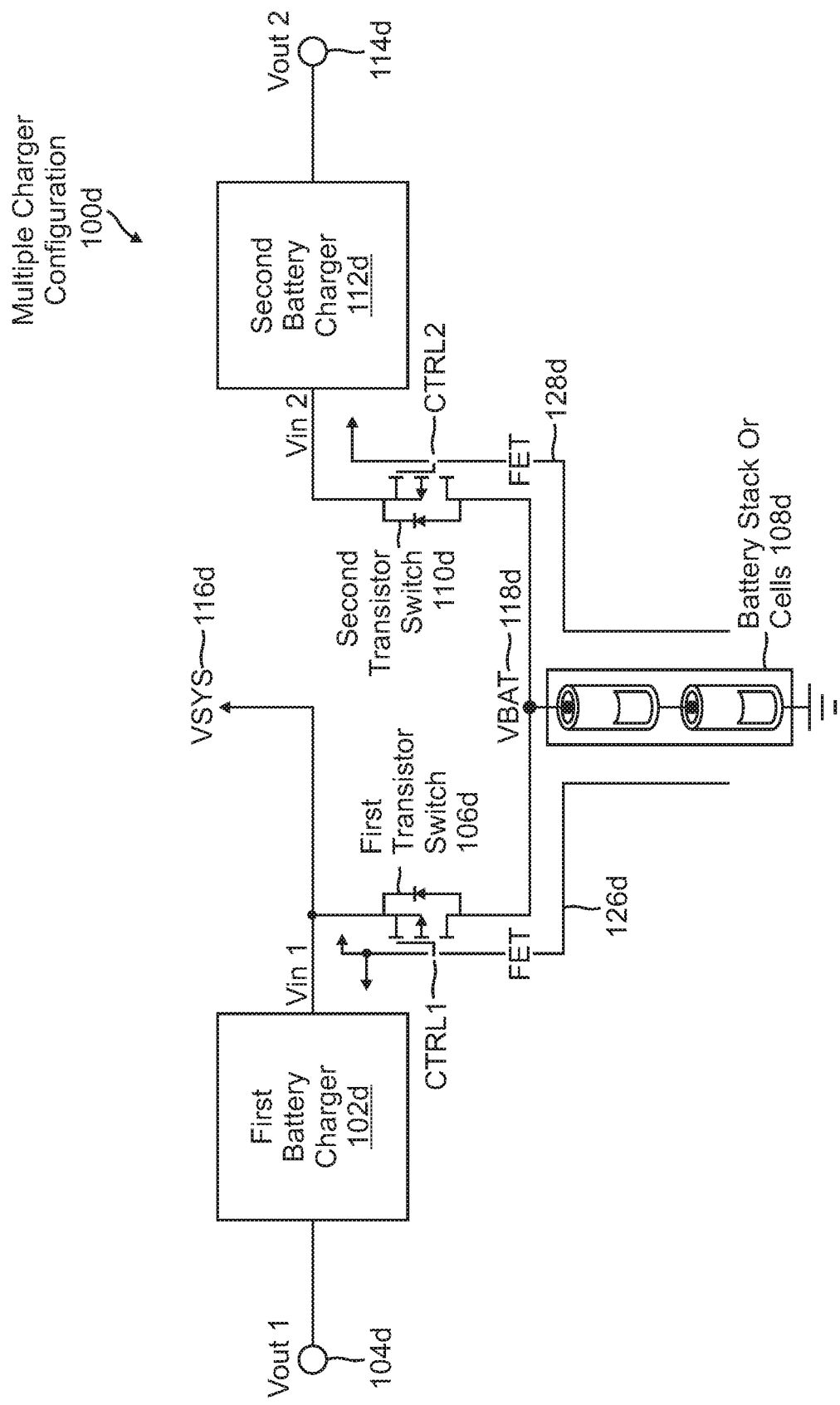

FIG. 1A is a schematic circuit diagram of a multiple charger configuration 100a, which can be utilized to implement one exemplary embodiment of the present invention. FIGS. 1B-1D are related circuit diagrams depicting exemplary multiple charger configurations 100b-100d, which can be utilized to perform a plurality of battery charging, discharging and/or powering functions with the exemplary multiple charger configuration 100a depicted in FIG. 1A. As such, referring to the embodiment depicted in FIG. 1A, the multiple charger configuration 100a includes a first battery charger 102a. Notably, any suitable DC-DC power converter or power supply adapted for charging batteries, cells or stacks for battery-operated products or devices can be utilized to implement the first battery charger 102a. For example, the first battery charger 102a can be implemented utilizing any suitable buck or step-down power converter, boost or step-up power converter, or buck-boost step-up/step-down power converter formed on an integrated circuit, wafer, chip or die.

The first battery charger 102a is configured to receive a first input voltage, Vin 1, at a first input terminal 104a. The output of the first battery charger 102a is coupled to the drain terminal of a first transistor switch 106a and also to an output terminal, VSYS 116a, of the multiple charger configuration 100a. For example, the first transistor switch 106a can be implemented utilizing a metal-oxide semiconductor field-effect transistor (MOSFET), power MOSFET or other suitable semiconductor transistor device capable of being switched on and off in response to a control signal applied at its control terminal. For this exemplary embodiment, the first transistor switch 106a is a FET that can be switched on (e.g., conducting) or off (e.g., not conducting) in response to the control signal, CTRL1, applied to the gate terminal of the first transistor switch 106a. Thus, when the control signal, CTRL1, is applied to its gate, the first transistor switch 106a is turned on and conducts the current utilized to charge or discharge the battery stack or cells 108a. For this exemplary embodiment, the output terminal, VSYS 116a, is utilized to deliver the supply voltage(s) to the battery-operated product or device involved. Thus, for this exemplary embodiment, the supply voltage can be delivered to the output terminal, VSYS 116a, from either the first battery charger 102a or the battery terminal, VBAT 118a coupled to the battery stack or cells 108a, in response to the application of the control signal, CTRL1.

The multiple charger configuration 100a also includes a second battery charger 112a. Any suitable DC-DC power converter or power supply adapted for charging batteries, cells or stacks for battery-operated products or devices can be utilized to implement the second battery charger 112a. For example, the second battery charger 112a can be implemented utilizing any suitable buck or step-down power converter, boost or step-up power converter, or buck-boost step-up/step-down power converter formed on an integrated circuit, wafer, chip or die.

The second battery charger 112a is configured to receive a second input voltage, Vin 2, at a second input terminal

114*a*. The output of the second battery charger 112*a* is coupled to the drain terminal of a second transistor switch 110*a*. The sources of the first transistor switch 106*a* and the second transistor switch 110*a* are connected to the battery terminal, VBAT 118*a*, the battery terminal, VBAT 118*a* is connected to a first side of the battery stack or cells 108*a*, and the second side of the battery stack or cells 108*a* is connected to circuit ground. For example, the second transistor switch 110*a* can be implemented utilizing a MOSFET, power MOSFET or other suitable semiconductor or transistor-based device capable of being switched on and off in response to a control signal applied at the control terminal (e.g., gate). For this exemplary embodiment, the second transistor switch 110*a* is a FET that can be switched on (e.g., conducting) or off (e.g., not conducting) in response to the second control signal, CTRL2, applied to the control or gate terminal of the second transistor switch 110*a*. Thus, when the second control signal, CTRL2, is applied to its control terminal or gate, the second transistor switch 116*a* is turned on and conducts the current from the second battery charger 112*a* utilized to charge (or discharge) the battery stack or cells 108*a*. For this exemplary embodiment, the supply voltage can also be delivered to the output terminal, VSYS 116*a*, from the second battery charger 112*a*, in response to the application of the two control signals, CTRL1 and CTRL2, to the respective control terminal or gate of the first transistor switch 106*a* and second transistor switch 110*a*, for example, simultaneously.

FIG. 1B is a schematic circuit diagram of a multiple charger configuration 100*b*, which can be utilized to depict a first exemplary functional or operational aspect of the embodiment depicted in FIG. 1A. Note that the same or like reference numbers are utilized in FIGS. 1A and 1B to refer to the same or like structural components or parts. As such, referring to the multiple charger configuration 100*b* shown in FIG. 1B, note that the voltage output from the first battery charger 102*b* can be coupled to the output terminal, VSYS 116*b* (e.g., current path indicated by the first arrowed line 119*b*) and/or to the battery stack or cells 108*b* (e.g., current path indicated by the second arrowed line 120*b*) if the first control signal, CTRL1, is applied to the control terminal or gate of the first transistor switch 106*b*. Thus, for the first exemplary functional or operational aspect of the embodiment shown in FIG. 1A, the first battery charger 102*b* can be utilized to deliver a regulated supply voltage at the output terminal, VSYS 116*b*, and/or deliver a regulated voltage and current to charge the battery stack or cells 108*b*.

FIG. 1C is a schematic circuit diagram of a multiple charger configuration 100*c*, which can be utilized to depict a second exemplary functional or operational aspect of the embodiment depicted in FIG. 1A. Note that the same or like reference numbers are utilized in FIGS. 1A and 1C to refer to the same or like structural components or parts. As such, referring to the multiple charger configuration 100*c* depicted in FIG. 1C, note that the voltage and current output from the second battery charger 112*c* can be coupled to the battery stack or cells 108*c* (e.g., current path indicated by the third arrowed line 122*c*) if the second control signal, CTRL2, is applied to the control terminal or gate of the second transistor switch 110*c*. Additionally, the voltage and current output from the second battery charger 112*c* can also be coupled to the output terminal, VSYS 116*c* (e.g., current path indicated by the fourth arrowed line 124*c*) if the first control signal, CTRL1, is applied simultaneously to the control terminal or gate of the first transistor switch 106*c*. Thus, for the second exemplary functional or operational aspect of the embodiment shown in FIG. 1A, the second battery charger 112*c* can be utilized to deliver a regulated voltage and current to charge the battery stack or cells 108*c*, and/or deliver a regulated supply voltage at the output terminal, VSYS 116*c*.

FIG. 1D is a schematic circuit diagram of a multiple charger configuration 100*d*, which can be utilized to depict a third exemplary functional or operational aspect of the embodiment depicted in FIG. 1A. Note that the same or like reference numbers are utilized in FIGS. 1A and 1D to refer to the same or like structural components or parts. As such, referring to the multiple charger configuration 100*d* depicted in FIG. 1D, note that the voltage VBAT 118*d* generated by the battery stack or cells 108*d*, can be coupled to the output terminal, VSYS 116*d* (e.g., current path indicated by the fifth arrowed line 126*d*) if the first control signal, CTRL1, is applied to the control terminal or gate of the first transistor switch 106*d*. Thus, the voltage and current of the battery stack or cells 108*d* can be utilized to deliver a supply voltage (e.g., unregulated) at the output terminal, VSYS 116*d*. Additionally, if the first battery charger 102*d* is reconfigured to form, for example, a DC-DC voltage regulator or converter with its functions reversed, the voltage, VBAT 118*d* can also be coupled to what is now an input terminal, VIN1, of the first battery charger 102*d* to generate a regulated (or unregulated) voltage, VOUT1, at what is now an output terminal 104*d*. Similarly, if the second battery charger 112*d* is reconfigured to form, for example, a DC-DC voltage regulator or converter also with its functions reversed, the voltage, VBAT 118*d* can be coupled to what is now an input, VIN2, of the reconfigured second battery charger 112*d* (e.g., current path indicated by the sixth arrowed line 128*d*) if the second control signal, CTRL2, is applied to the control terminal or gate of the second transistor switch 110*d*. As such, the reconfigured second battery charger 112*d* can generate a regulated (or unregulated) voltage, VOUT2, at what is now an output terminal 114*d*. At this point, it should be noted that, as demonstrated by FIGS. 1A-1D and the corresponding text, the functionality of the multiple charger configuration 100*a* is bidirectional. Also, it should be noted that, in accordance with the teachings of the present application, the multiple charger configuration 100*a* provides a multiple input, multiple charger configuration for power delivery in one system.

More precisely, referring to the exemplary embodiment depicted in FIG. 1A, the battery voltage, VBAT 118*a*, can be utilized to provide power for the system at the terminal, VSYS 116*a*. Also, referring to the exemplary embodiment for example, if a reverse charging operation is utilized, then the battery voltage, VBAT 118*a*, can be utilized to supply power for the first input voltage, Vin1, and/or for the second input voltage, Vin 2, via the respective battery charger 102*a* and/or 112*a*. Thus, in accordance with the teachings of the present application, the multiple (e.g., two) charger configuration shown in FIG. 1A can be utilized to receive the input voltages from multiple (e.g., two) input sources and charge the battery, battery stack, battery pack, or one or more cells to support the system voltages utilized in battery-operated products or devices. Moreover, the battery stack or cells 108*a* shown in FIG. 1A can be utilized to generate the input voltages, Vin 1 and/or Vin 2 (e.g., VOUT 1 and/or VOUT 2 in FIG. 1D), if a reverse charging operation is desired.

Figure 2:
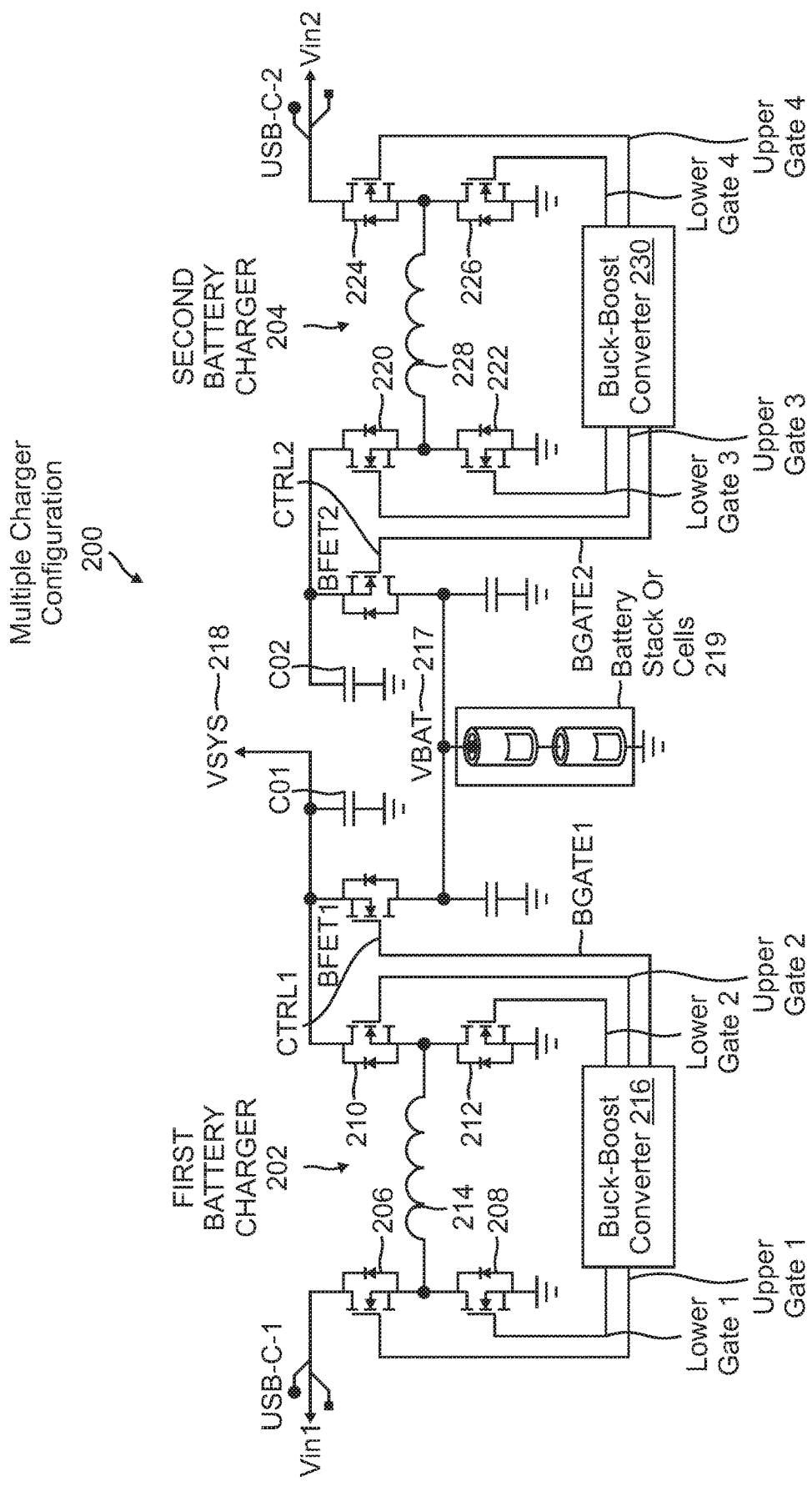
FIG. 2 is a schematic circuit diagram of a multiple charger configuration that can be utilized to implement a second exemplary embodiment of the present invention.

FIG. 2 is a schematic circuit diagram of a multiple charger configuration 200, which can be utilized to implement a second exemplary embodiment of the present invention. In the exemplary embodiment shown, the multiple charger configuration 200 in FIG. 2 includes a first battery charger 202 configured to receive a first input voltage, VIN 1, via a first USB-C connector, USB-C-1, and a second battery charger 204 configured to receive a second input voltage, VIN 2, via a second USB-C connector, USB-C-2. The USB-C connector is a standard interface that provides data transfer and also supports bi-directional power flow at a much higher level than prior USB connectors. For example, with a default 5V input voltage, a USB-C port is capable of negotiating with a plugged-in device to raise the port voltage to 12v, 20V, or another mutually agreed on voltage, at a mutually agreed on current level. The maximum power a USB-C port can deliver is 20V at 5 A, or 100 W of power. As such, this amount of power is more than adequate to charge any mobile or other battery-operated product or device.

Returning to FIG. 2, the input voltage, VIN 1, is coupled to the drain terminal of a first switching transistor, 206. A first output, UPPER GATE 1, of a buck-boost converter 216 is coupled to the control or gate terminal of the first switching transistor, 206, and a second output, LOWER GATE 1, of the buck-boost converter 216 is coupled to the control or gate terminal of the second switching transistor 208. The source terminal of the first switching transistor 206 is coupled to the drain terminal of the second switching transistor 208, and the source of the second switching transistor 208 is coupled to circuit ground. The node between the source terminal of the first switching transistor 206 and drain terminal of the second switching transistor 208 is coupled to a first end of a first inductor 214. The second end of the first inductor 214 is coupled to a node connected between the source terminal of a third switching transistor 210 and the drain terminal of a fourth switching transistor 212. The source of the fourth switching transistor 212 is coupled to circuit ground. A third output, UPPER GATE 2, of the buck-boost converter 216 is coupled to the control or gate terminal of the third switching transistor 210, and a fourth output, LOWER GATE 2, of the buck-boost converter 216 is coupled to the control or gate terminal of the fourth switching transistor 212. The drain terminal of the third switching transistor 210 is coupled to an output capacitor, Co1 and the output terminal, VSYS 218. A fifth output, BGATE 1, of the buck-boost converter 216 is coupled to the control or gate terminal of a fifth switching transistor, BFET 1. The fifth output, BGATE 1, can output a first control signal, CTRL1, to control the on/off switching of the fifth switching transistor, BFET 1, under the control of the buck-boost converter 216. For example, in this embodiment, if the first control signal, CTRL1, is output, the fifth switching transistor, BFET1, is turned on or conducting. If the first control signal, CTRL1, is not output, the fifth switching transistor, BFET1, is turned off or not conducting. The source terminal of the fifth switching transistor, BFET 1, is coupled to a battery stack or cells 219 via a battery terminal, VBAT 217.

In the buck mode of operation, responsive to the ratio of the output voltage, VSYS, to the input voltage, VIN 1, the buck-boost converter 216 outputs suitable upper and lower gate signals, UPPER GATE 1 and LOWER GATE 1, to control the switching events of the first and second switching transistors, 206, 208, and thereby generate an inductor current through the first inductor 214. In the boost mode of operation, responsive to the ratio of the output voltage, VSYS 218, to the input voltage, VIN 1, the buck-boost converter 216 outputs suitable upper and lower gate signals, UPPER GATE 2 and LOWER GATE 2, to control the switching events of the third and fourth switching transistors 210, 212, and thereby generate the system voltage at the output terminal, VSYS 218. During the boost mode of operation, the buck-boost converter 216 controls the switching events to keep the first switching transistor 206 on and the second switching transistor 208 off. For example, the buck-boost converter 216 can be implemented utilizing any suitable DC-DC converter or regulator formed on an integrated circuit, wafer, chip or die. In one exemplary embodiment, an ISL9238 buck-boost converter manufactured by Intersil Americas LLC can be utilized to implement buck-boost converter 216.

Notably, in the exemplary embodiment shown in FIG. 2, the four switching transistors (e.g., FETs) 206, 208, 210, 212 coupled to the buck-boost converter 216 are configured to form a forward-buck leg and a forward-boost leg. Thus, by operating the appropriate leg, the buck-boost charger topology shown can be operated in a forward buck mode or forward boost mode to charge the battery stack or cells 219. The buck-boost charger topology shown in FIG. 2 can also be operated in a reverse buck mode to deliver power out of the USB-C-1 terminal for charging an external, portable electronic device, such as, for example, a tablet, smart phone, and the like. In other words, the buck-boost battery charger configurations shown in FIG. 2 can provide mobile or battery-operated systems with the capability of employing two-way power delivery utilizing, for example, the reversible USB-C connectors shown.

Returning to the exemplary embodiment shown in FIG. 2, the multiple charger configuration 200 also includes a second battery charger 204 adapted to receive a second input voltage, VIN 2, via a second USB-C connector, USB-C-2. The second input voltage, VIN 2, is coupled to the drain terminal of a sixth switching transistor, 224. A first output, UPPER GATE 4, of a second buck-boost converter 230 is coupled to the control or gate terminal of the sixth switching transistor, 224, and a second output, LOWER GATE 4, of the second buck-boost converter 230 is coupled to the control or gate terminal of a seventh switching transistor 226. The source terminal of the sixth switching transistor 224 is coupled to the drain terminal of the seventh switching transistor 226, and the source of the seventh switching transistor 226 is coupled to circuit ground. The node between the source terminal of the sixth switching transistor 224 and drain terminal of the seventh switching transistor 226 is coupled to a first end of a second inductor 228. The second end of the second inductor 228 is coupled to a node connected between the source terminal of an eighth switching transistor 220 and the drain terminal of a ninth switching transistor 222. The source of the ninth switching transistor 222 is coupled to circuit ground. A third output, UPPER GATE 3, of the second buck-boost converter 230 is coupled to the control or gate terminal of the eighth switching transistor 220, and a fourth output, LOWER GATE 3, of the second buck-boost converter 230 is coupled to the control or gate terminal of the ninth switching transistor 222. The drain terminal of the eighth switching transistor 220 is coupled to the drain terminal of a tenth switching transistor BFET 2 and a second capacitor, Co2. A fifth output, BGATE 2, of the second buck-boost converter 230 is coupled to the control or gate terminal of the tenth switching transistor, BFET 2. The fifth output, BGATE 2, can output a second control signal, CTRL2, to control the on/off switching of the tenth switching transistor, BFET 2, under the control of the second buck-boost converter 230. The source terminal of the tenth switching transistor, BFET 2, is coupled to the battery stack or cells 219 via the battery terminal, VBAT 217.

In the buck mode of operation, responsive to the ratio of the output voltage, VBAT, to the input voltage, VIN 2, the second buck-boost converter 230 outputs suitable upper and lower gate signals, UPPER GATE 4 and LOWER GATE 4, to control the switching events of the sixth and seventh switching transistors, 224, 226, and thereby generate an inductor current through the second inductor 228. In the boost mode of operation, responsive to the ratio of the output voltage, VBAT, to the input voltage, VIN 2, the buck-boost converter 230 outputs suitable upper and lower gate signals, UPPER GATE 3 and LOWER GATE 3, to control the switching events of the eighth and ninth switching transistors 220, 222, and thereby generate the battery voltage at the battery terminal, VBAT 217. During the boost mode of operation, the second buck-boost converter 230 controls the switching events to keep the sixth switching transistor 224 on and the seventh switching transistor 226 off. The second buck-boost converter 230 can be implemented utilizing any suitable DC-DC converter or regulator formed on an integrated circuit, wafer, chip or die. For example, in one exemplary embodiment, an ISL9238 buck-boost converter manufactured by Intersil Americas LLC can be utilized to implement the second buck-boost converter 230.

For the exemplary embodiment shown in FIG. 2, suitable buck-boost converters 216, 230 (e.g., ISL9238) are utilized along with the external components shown to form the first battery charger 202 and second battery charger 204. The two battery chargers 202, 204 are configured to function similarly to the first and second battery chargers 102a, 112a depicted in FIG. 1A. However, although two buck-boost converters are shown in FIG. 2, in other embodiments, one or more buck converters and/or boost converters, or any other suitable DC/DC converters, can be utilized instead to perform the same or similar functions. Also, for example, although the exemplary embodiment shown in FIG. 2 depicts two buck-boost converters (e.g., each buck-boost converter formed on a single integrated circuit, wafer, chip or die), in other embodiments, the two buck-boost converters 216, 230 can be formed on a single integrated circuit, wafer, chip or die. Note that, for the exemplary embodiment shown, the coordination of the application of the control signals, CTRL1 and CTRL2, are provided by the system involved. For example, in this embodiment, the system connected to the output terminal VSYS 218 can transmit a (e.g., charge current) command signal to each one of the buck-boost converters 216, 230 via one or more communication links operated in accordance with the I²C communication protocol. The command signal can function to coordinate the buck-boost converters' applications of the control signals, CTRL1 and CTRL2. Although the I²C communication protocol is utilized to convey the command signals in this exemplary embodiment, any suitable communication link or protocol can be utilized.

In one exemplary operational scenario, referring to FIG. 2, both the first battery charger 202 and the second battery charger 204 are operating in the charging constant current (CC) mode. Thus, both of the battery switching transistors (BFET 1 and BFET 2) are turned on (conducting) to charge the battery stack or cells 219, and the system voltage, VSYS 218, is approximately equal to the battery voltage, VBAT 217. As such, both battery chargers 202, 204 are in the charging loop control path to regulate their respective charging currents, and these charging currents can flow together in parallel to charge the battery stack or cells 219 with no problem. As such, if the load at the output terminal, VSYS 218, becomes heavy enough, then the input current limit loop for both the first and second battery chargers 202, 204 will function appropriately. However, considering a second operational scenario in which the battery stack or cells 219 has/have a full charge, both the first battery charger 202 and the second battery charger 204 are in the constant voltage (CV) mode, but both of the battery switching transistors BFET 1 and BFET 2 are still turned on (conducting), and the system voltage at the output terminal, VSYS 218, is approximately equal to the battery voltage at the terminal, VBAT 217, which is still an appropriate result. Next, considering a third operational scenario, in which both the first battery charger 202 and the second battery charger 204 are in the CV mode, and both battery switching transistors, BFET 1, BFET 2 are turned off (not conducting). Consequently, only the first battery charger 202 and the battery 206 can supply the VSYS load, which thus functions similarly to a single battery charger configuration and also provides an appropriate result.

Now consider a fourth operational scenario, still referring to FIG. 2, in which one of the battery chargers 202 or 204 is in the CC mode and the corresponding battery switching transistor, BFET 1 or BFET 2, is turned on, but the other battery charger is the CV mode and the corresponding battery switching transistor or BFET is turned off. For example, assuming that the first battery charger 202 is in the CC mode and BFET 1 is turned on, and the second battery charger 204 is in the CV mode and BFET 2 is turned off, then only the first battery charger 202 and the battery stack or cells 219 can supply the VSYS load, which thus functions similarly to a single charger. However, if the first battery charger 202 is in the CV mode and BFET1 is turned off, and the second battery charger 204 is in the CC mode and BFET2 is turned on, then only the first battery charger 202 can supply the VSYS load until the input current limit is reached. If the load current reaches beyond the limit set by input current limit of the first battery charger 202, the output voltage at VSYS 218 will drop below the level of the battery voltage at the terminal, VBAT 217, and the second battery charger 204 will supply part of the current to the output terminal, VSYS 218 via the body diode of BFET1. Again, this scenario provides a suitable result.

In a fifth operational scenario, only the input voltage at the first USB-C-1 connector is present. Thus, the second battery charger 204 is in the battery-only mode, so the second battery switching transistor BFET2 will be turned on. Consequently, the entire multiple charger configuration 200 will function as if only a single charger (e.g., first battery charger 202) is present. In this case, for example, the other charger (e.g., second battery charger 204) can be utilized in the USB On-The-Go (OTG) operational mode for a suitable result.

In a sixth operational scenario, only the input voltage (VIN2) at the second USB-C-2 connector is present. Thus, if the second battery charger 204 is not in the CC mode and the second battery transistor switch BFET2 is turned off, then only the battery stack or cells 219 can supply the VSYS load via BFET1. However, if the second battery charger 204 is in the CC mode, and the second battery transistor switch BFET2 is turned on, then the second battery charger 206 can supply the VSYS load through the first battery transistor switch BFET1 (e.g., the first battery charger 202 is in the battery-only mode and BFET1 will turn on). Again, in this case, for example, the first battery charger 202 can be utilized in the OTG mode for a suitable result.

Figure 3:
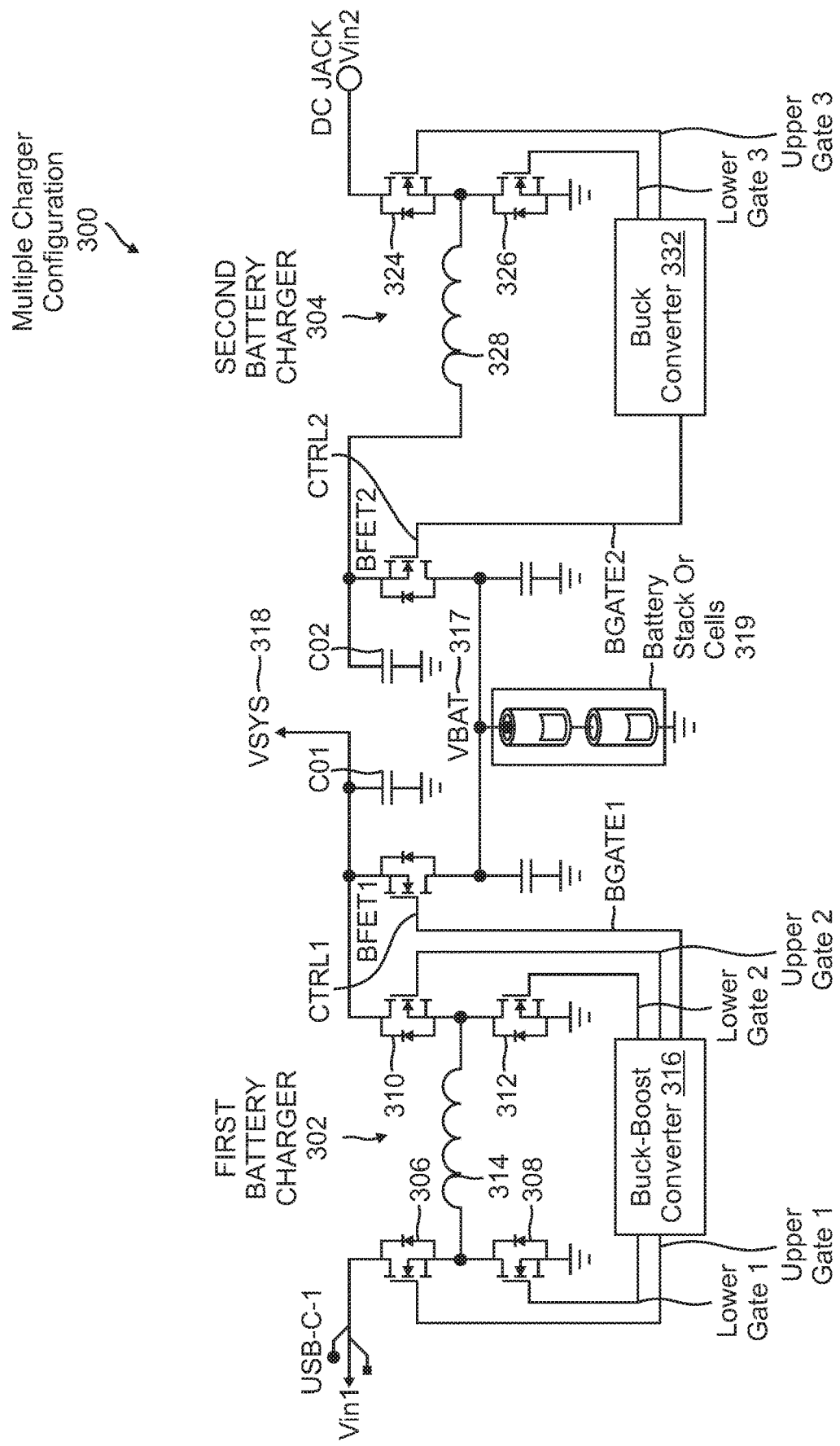
FIG. 3 is a schematic circuit diagram of a multiple charger configuration that can be utilized to implement a third exemplary embodiment of the present invention.

FIG. 3 is a schematic circuit diagram of a multiple charger configuration 300, which can be utilized to implement a third exemplary embodiment of the present invention. In the exemplary embodiment shown, the multiple charger configuration 300 in FIG. 3 includes a first battery charger 302 configured to receive a first input voltage, VIN 1, via a USB-C connector, USB-C-1, and a second battery charger 304 configured to receive a second input voltage, VIN 2, via a non-USB-C connector (e.g., a DC Jack). The input voltage, VIN 1, is coupled to the drain terminal of a first switching transistor, 306. A first output, UPPER GATE 1, of a buck-boost converter 316 is coupled to the control or gate terminal of the first switching transistor, 306, and a second output, LOWER GATE 1, of the buck-boost converter 316 is coupled to the control or gate terminal of the second switching transistor 308. The source terminal of the first switching transistor 306 is coupled to the drain terminal of the second switching transistor 308, and the source of the second switching transistor 308 is coupled to circuit ground. The node between the source terminal of the first switching transistor 306 and drain terminal of the second switching transistor 308 is coupled to a first end of a first inductor 314. The second end of the first inductor 314 is coupled to a node connected between the source terminal of a third switching transistor 310 and the drain terminal of a fourth switching transistor 312. The source of the fourth switching transistor 312 is coupled to circuit ground. A third output, UPPER GATE 2, of the buck-boost converter 316 is coupled to the control or gate terminal of the third switching transistor 310, and a fourth output, LOWER GATE 2, of the buck-boost converter 316 is coupled to the control or gate terminal of the fourth switching transistor 312. The drain terminal of the third switching transistor 310 is coupled to an output capacitor, Co1 and the output terminal, VSYS 318. A fifth output, BGATE 1, of the buck-boost converter 316 is coupled to the control or gate terminal of a fifth switching transistor, BFET 1, and can output a first control signal, CTRL1, to control the on/off switching of the fifth switching transistor, BFET 1, under the control of the buck-boost converter 316. The source terminal of the fifth switching transistor, BFET 1, is coupled to a battery stack or cells 319 via a battery terminal, VBAT 317.

In the buck mode of operation, responsive to the ratio of the output voltage, VSYS, to the input voltage, VIN 1, the buck-boost converter 316 outputs suitable upper and lower gate signals, UPPER GATE 1 and LOWER GATE 1, to control the switching events of the first and second switching transistors, 306, 308, and thereby generate an inductor current through the first inductor 314. In the boost mode of operation, responsive to the ratio of the output voltage, VSYS, to the input voltage, VIN 1, the buck-boost converter 316 outputs suitable upper and lower gate signals, UPPER GATE 2 and LOWER GATE 2, to control the switching events of the third and fourth switching transistors 310, 312, and thereby generate the system voltage at the output terminal, VSYS 318. During the boost mode of operation, the buck-boost converter 316 controls the switching events to keep the first switching transistor 306 on and the second switching transistor 308 off. The buck-boost converter 316 can be implemented utilizing any suitable buck-boost converter formed on an integrated circuit, wafer, chip or die. For example, in one exemplary embodiment, an ISL9238 buck-boost converter manufactured by Intersil Americas LLC can be utilized to implement buck-boost converter 316.

In the exemplary embodiment shown, the multiple charger configuration 300 in FIG. 3 also includes a second battery charger 304 adapted to receive a second input voltage, VIN 2, via a second, non-USB-C connector, or DC Jack in this example. The second input voltage, VIN 2, is coupled to the drain terminal of a sixth switching transistor, 324. A first output, UPPER GATE 3, of a buck converter 332 is coupled to the control or gate terminal of the sixth switching transistor, 324, and a second output, LOWER GATE 3, of the buck converter 332 is coupled to the control or gate terminal of a seventh switching transistor 326. The source terminal of the sixth switching transistor 324 is coupled to the drain terminal of the seventh switching transistor 326, and the source of the seventh switching transistor 326 is coupled to circuit ground. The node between the source terminal of the sixth switching transistor 324 and drain terminal of the seventh switching transistor 326 is coupled to a first end of a second inductor 328. The second end of the second inductor 328 is coupled to a node connected to a drain terminal of an eighth switching transistor, BFET 2, and a capacitor, C02. The second side of the capacitor, Co2, is coupled to circuit ground. A third output, BGATE 2, of the buck converter 332 is coupled to the control or gate terminal of the eighth switching transistor, BFET 2, and can output a second control signal, CTRL2, to control the on/off switching of the eighth switching transistor, BFET 2, under the control of the buck converter 332. The source terminal of the eighth switching transistor, BFET 2, is coupled to the battery stack or cells 319 via the battery terminal, VBAT 317.

In operation, responsive to the ratio of the output voltage, VBAT, to the input voltage, VIN 2, the buck converter 332 outputs suitable upper and lower gate signals, UPPER GATE 3 and LOWER GATE 3, to control the switching events of the sixth and seventh switching transistors, 324, 326, and thereby generate an inductor current through the second inductor 328. Therefore, when the buck converter 332 applies the second control signal, CTRL2 to the control or gate terminal of the eighth switching transistor, BFET 2, the eighth switching transistor, BFET 2, is turned on (conducting) and the voltage generated at the drain of the eighth switching transistor, BFET 2, is coupled to the battery stack or cells 319 via the battery terminal VBAT 317. The buck converter 332 can be implemented utilizing any suitable buck converter formed on an integrated circuit, wafer, chip or die. For example, in one exemplary embodiment, an ISL95520 buck converter manufactured by Intersil Americas LLC can be utilized to implement buck converter 332. Note that, for the exemplary embodiment shown, the coordination of the application of the control signals, CTRL1 and CTRL2, is provided by the system involved. For example, in this embodiment, the system connected to the output terminal VSYS 318 transmits a (e.g., charge current) command signal to each one of the buck-boost converter 316 and buck converter 332 via one or more communication links operated in accordance with the I$^2$C communication protocol. The command signal functions to coordinate the converters' application of the control signals, CTRL1 and CTRL2. Although the I$^2$C communication protocol is utilized to convey the command signals in this exemplary embodiment, any suitable communication link or protocol can be utilized.

Figure 4:
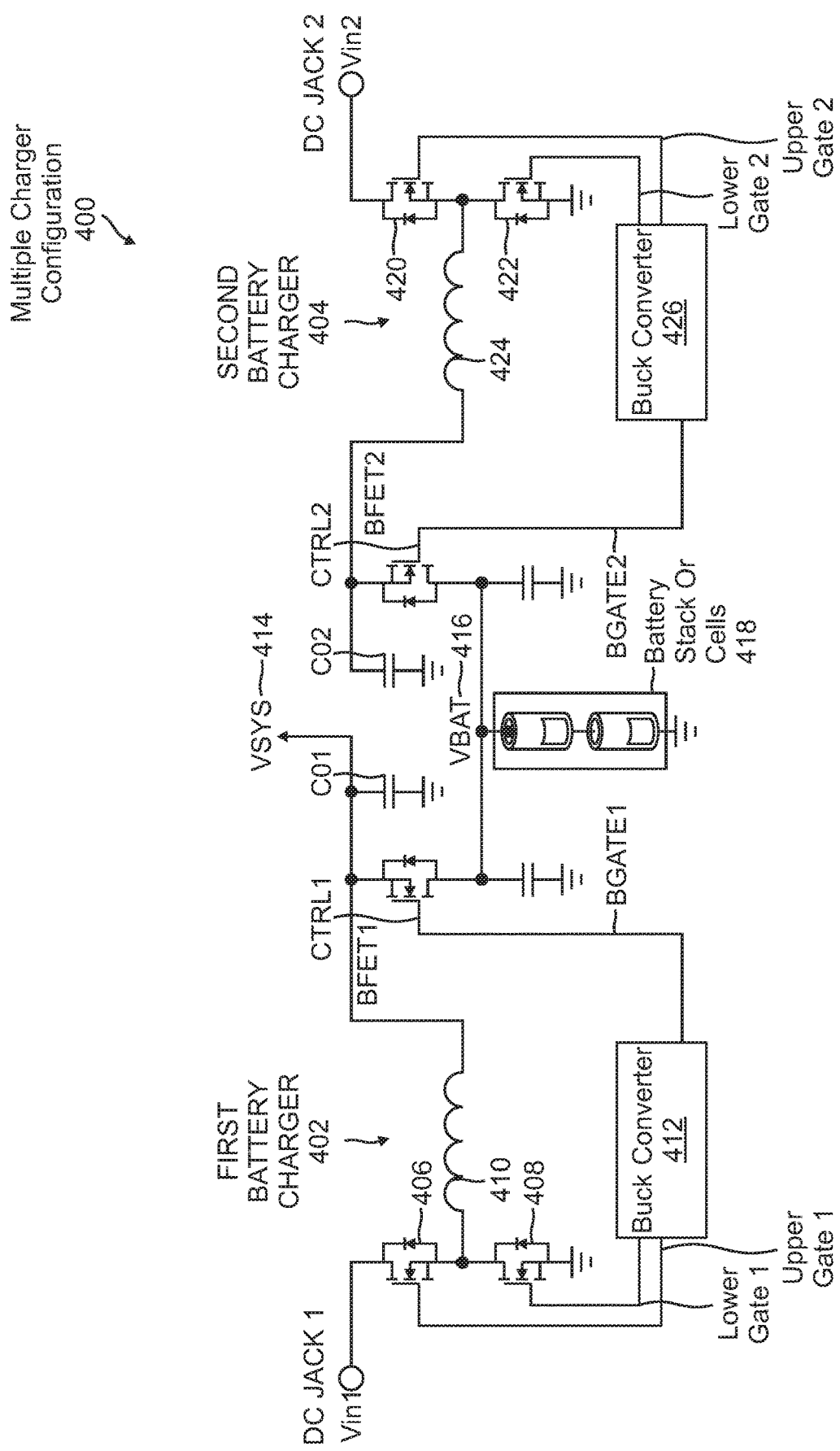
FIG. 4 is a schematic circuit diagram of a multiple charger configuration that can be utilized to implement a fourth exemplary embodiment of the present invention.

FIG. 4 is a schematic circuit diagram of a multiple charger configuration 400, which can be utilized to implement a fourth exemplary embodiment of the present invention. In the exemplary embodiment shown, the multiple charger configuration 400 in FIG. 4 includes a first battery charger 402 configured to receive a first input voltage, VIN 1, via a first, non-USB-C connector, or first DC Jack 1. The multiple charger configuration 400 in FIG. 4 also includes a second battery charger 404 configured to receive a second input voltage, VIN 2, via a second, non-USB-C connector, or DC Jack 2. The first input voltage, VIN 1, is coupled to the drain terminal of a first switching transistor, 406. A first output, UPPER GATE 1, of a first buck converter 412 is coupled to the control or gate terminal of the first switching transistor, 406, and a second output, LOWER GATE 1, of the first buck converter 412 is coupled to the control or gate terminal of a second switching transistor 408. The source terminal of the first switching transistor 406 is coupled to the drain terminal of the second switching transistor 408, and the source of the second switching transistor 408 is coupled to circuit ground. The node between the source terminal of the first switching transistor 406 and drain terminal of the second switching transistor 408 is coupled to a first end of a first inductor 410. The second end of the first inductor 410 is coupled to a node connected to a drain terminal of a third switching transistor, BFET 1, a capacitor, C01, and the output terminal, VSYS 414. The second side of the capacitor, C01, is coupled to circuit ground. A third output, BGATE 1, of the first buck converter 412 is coupled to the control or gate terminal of the third switching transistor, BFET 1, and can output a first control signal, CTRL1, to control the on/off switching of the third switching transistor, BFET 1, under the control of the first buck converter 412. The source terminal of the third switching transistor, BFET 1, is coupled to the battery stack or cells 418 via the battery terminal, VBAT 316.

In operation, responsive to the ratio of the output voltage, VSYS, to the input voltage, VIN 1, the first buck converter 412 outputs suitable upper and lower gate signals, UPPER GATE 1 and LOWER GATE 1, to control the switching events of the first and second switching transistors, 406, 408, and thereby generate an inductor current through the first inductor 410. Therefore, when the first buck converter 412 applies the first control signal, CTRL1 to the control or gate terminal of the third switching transistor, BFET 1, the third switching transistor, BFET 1, is turned on (conducting) and the voltage generated at the drain of the third switching transistor, BFET 1, and the output terminal, VSYS 414, is coupled to the battery stack or cells 418 via the battery terminal VBAT 416. The first buck converter 412 can be implemented utilizing any suitable buck converter formed on an integrated circuit, wafer, chip or die. For example, in one exemplary embodiment, an ISL95520 buck converter manufactured by Intersil Americas LLC can be utilized to implement the first buck converter 412.

The second input voltage, VIN 2, is coupled to the drain terminal of a fourth switching transistor, 420. A first output, UPPER GATE 2, of a second buck converter 426 is coupled to the control or gate terminal of the fourth switching transistor, 420, and a second output, LOWER GATE 2, of the second buck converter 426 is coupled to the control or gate terminal of a fifth switching transistor 422. The source terminal of the fourth switching transistor 420 is coupled to the drain terminal of the fifth switching transistor 422, and the source of the fifth switching transistor 422 is coupled to circuit ground. The node between the source terminal of the fourth switching transistor 420 and drain terminal of the fifth switching transistor 422 is coupled to a first end of a second inductor 424. The second end of the second inductor 424 is coupled to a node connected to a drain terminal of a sixth switching transistor, BFET 2, and a capacitor, C02. The second side of the capacitor, C02, is coupled to circuit ground. A third output, BGATE 2, of the second buck converter 426 is coupled to the control or gate terminal of the sixth switching transistor, BFET 2, and can output a second control signal, CTRL2, to control the on/off switching of the sixth switching transistor, BFET 2, under the control of the second buck converter 426. The source terminal of the sixth switching transistor, BFET 2, is coupled to the battery stack or cells 418 via the battery terminal, VBAT 416.

In operation, referring to FIG. 4, responsive to the ratio of the output voltage, VBAT, to the input voltage, VIN 2, the second buck converter 426 outputs suitable upper and lower gate signals, UPPER GATE 2 and LOWER GATE 2, to control the switching events of the fourth and fifth switching transistors, 420, 422, and thereby generate an inductor current through the second inductor 424. Therefore, when the second buck converter 426 applies the second control signal, CTRL2 to the control or gate terminal of the sixth switching transistor, BFET 2, the sixth switching transistor, BFET 2, is turned on (conducting) and the voltage generated at the drain of the sixth switching transistor, BFET 2, is coupled to the battery stack or cells 418 via the battery terminal VBAT 416. The second buck converter 426 can be implemented utilizing any suitable buck converter formed on an integrated circuit, wafer, chip or die. For example, in one exemplary embodiment, an ISL95520 buck converter manufactured by Intersil Americas LLC can be utilized to implement the second buck converter 426. Note that, for the exemplary embodiment shown, the coordination of the application of the control signals, CTRL1 and CTRL2, is provided by the system involved. For example, in this embodiment, the system connected to the output terminal VSYS 414 transmits a (e.g., charge current) command signal to each one of the buck converters 412, 426 via one or more communication links operated in accordance with the I$^2$C communication protocol. The command signal functions to coordinate the converters' application of the control signals, CTRL1 and CTRL2. Although the I$^2$C communication protocol is utilized to convey the command signals in this exemplary embodiment, any suitable communication link or protocol can be utilized.

Figure 5:
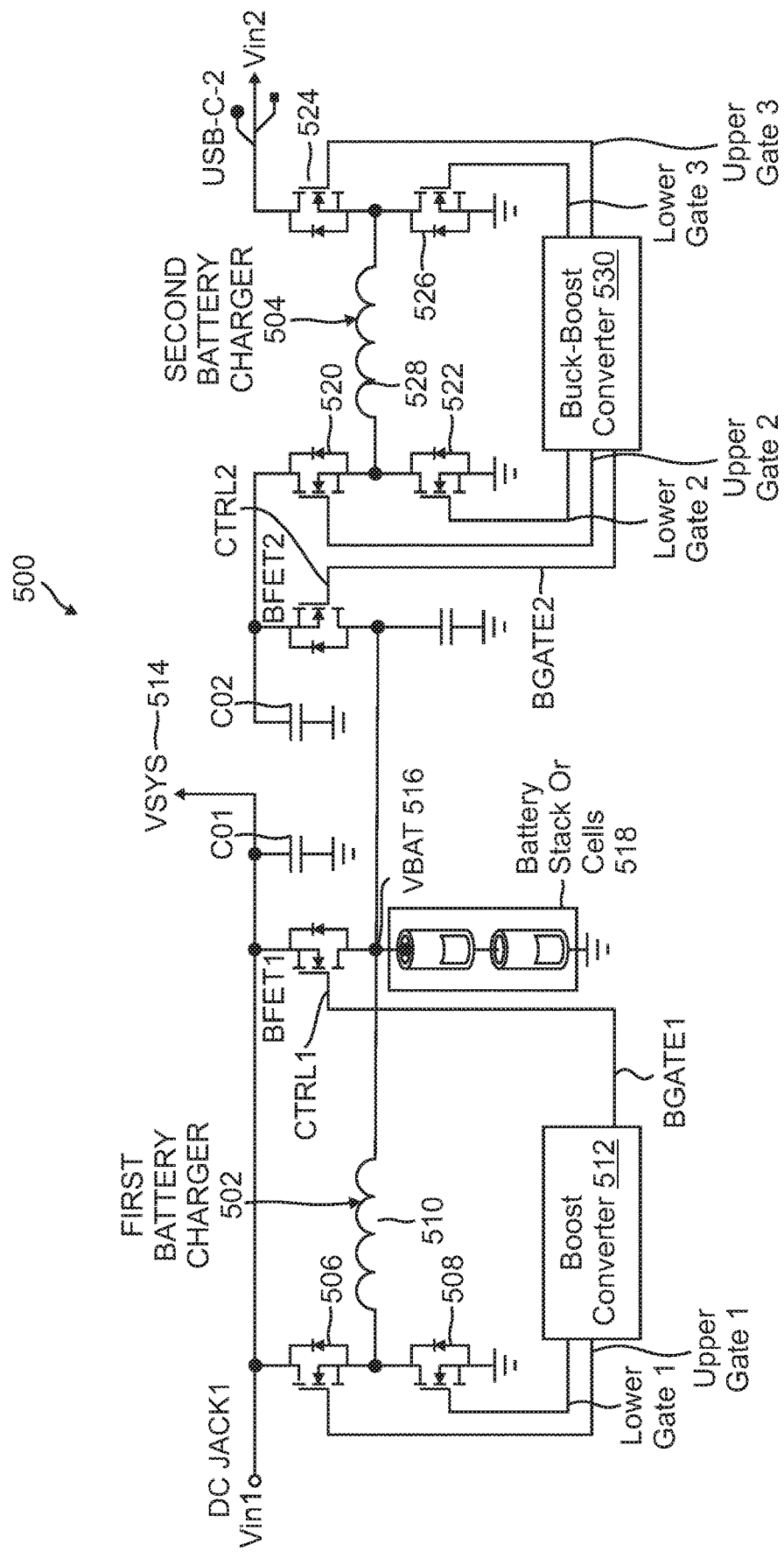
FIG. 5 is a schematic circuit diagram of a multiple charger configuration that can be utilized to implement a fifth exemplary embodiment of the present invention.

FIG. 5 is a schematic circuit diagram of a multiple charger configuration 500, which can be utilized to implement a fifth exemplary embodiment of the present invention. In the exemplary embodiment shown, the multiple charger configuration 500 in FIG. 5 includes a first battery charger 502 configured to receive a first input voltage, VIN 1, via a first, non-USB-C connector, or DC Jack 1. The multiple charger configuration 500 in FIG. 5 also includes a second battery charger 504 configured to receive a second input voltage, VIN 2, via a second (e.g., USB-C) connector, USB-C-2. The first input voltage, VIN 1, is coupled to the drain terminal of a first switching transistor, 506. A first output, UPPER GATE 1, of a boost converter 512 is coupled to the control or gate terminal of the first switching transistor, 506, and a second output, LOWER GATE 1, of the boost converter 512 is coupled to the control or gate terminal of a second switching transistor 508. The source terminal of the first switching transistor 506 is coupled to the drain terminal of the second switching transistor 508, and the source of the second switching transistor 508 is coupled to circuit ground. The node between the source terminal of the first switching transistor 506 and drain terminal of the second switching transistor 508 is coupled to a first end of a first inductor 510. The drain terminal of the first switching transistor 506 is coupled to the drain terminal of a third switching transistor, BFET 1, a capacitor, C01, and the output terminal, VSYS 514. The second side of the capacitor, C01, is coupled to circuit ground. The second end of the first inductor 510 is coupled to a node connected to the source terminal of the third switching transistor, BFET 1, the battery stack or cells 518 via the battery terminal 516, and the source terminal of a fourth switching transistor, BFET 2. A third output, BGATE 1, of the boost converter 512 is coupled to the control or gate terminal of the third switching transistor, BFET 1, and can output a first control signal, CTRL1, to control the on/off switching of the third switching transistor, BFET 1, under the control of the boost converter 512.

In operation, responsive to the ratio of the output voltage, VSYS, to the input voltage, VIN 1, the boost converter 512 outputs suitable upper and lower gate signals, UPPER GATE 1 and LOWER GATE 1, to control the switching events of the first and second switching transistors, 506, 508, and thereby generate an inductor current through the first inductor 510. Therefore, when the boost converter 512 applies the first control signal, CTRL1 to the control or gate terminal of the third switching transistor, BFET 1, the third switching transistor, BFET 1, is turned on (conducting) and the voltage generated at the drain of the third switching transistor, BFET 1, and the output terminal, VSYS 514, is coupled to the battery stack or cells 518 via the battery terminal VBAT 516. The boost converter 512 can be implemented utilizing any suitable boost converter formed on an integrated circuit, wafer, chip or die. For example, in one exemplary embodiment, an ISL95521A boost converter manufactured by Intersil Americas LLC can be utilized to implement the boost converter 512.

The second input voltage, VIN 2, is coupled to the drain terminal of a fourth switching transistor, 524. A first output, UPPER GATE 2, of a buck-boost converter 530 is coupled to the control or gate terminal of a fifth switching transistor 520, and a second output, LOWER GATE 2, of the buck-boost converter 530 is coupled to the control or gate terminal of a sixth switching transistor 522. The source terminal of the fifth switching transistor 520 is coupled to the drain terminal of the sixth switching transistor 522, and the source terminal of the sixth switching transistor 522 is coupled to circuit ground. The node between the source terminal of the fifth switching transistor 520 and drain terminal of the sixth switching transistor 522 is coupled to a first end of a second inductor 528. The second end of the second inductor 528 is coupled to a node connected to the source terminal of the fourth switching transistor 524 and the drain terminal of a seventh switching transistor 526. The source of the seventh switching transistor 526 is coupled to circuit ground. A third output, UPPER GATE 3, of the buck-boost converter 530 is coupled to the control or gate terminal of the fourth switching transistor 524, and a fourth output, LOWER GATE 3, of the buck-boost converter 530 is coupled to the control or gate terminal of the seventh switching transistor 526. The drain terminal of the fifth switching transistor 520 is coupled to the drain terminal of an eighth switching transistor, BFET 2, and a capacitor, C02. The second side of the capacitor, C02, is coupled to circuit ground. A fifth output, BGATE 2, of the buck-boost converter 530 is coupled to the control or gate terminal of the eighth switching transistor, BFET 2, and can output a second control signal, CTRL2, to control the on/off switching of the eighth switching transistor, BFET 2, under the control of the buck-boost converter 530. The source terminal of the eighth switching transistor, BFET 2, is coupled to the battery stack or cells 518 via the battery terminal, VBAT 516.

In operation, referring to FIG. 5, responsive to the ratio of the output voltage, VBAT, to the input voltage, VIN 2, the buck-boost converter 530 outputs suitable upper and lower gate signals, UPPER GATE 2 and LOWER GATE 2, to control the switching events of the fifth and sixth switching transistors, 520, 522, and thereby generate an inductor current through the second inductor 528. Therefore, when the buck-boost converter 530 applies the second control signal, CTRL2 to the control or gate terminal of the eight switching transistor, BFET 2, the eighth switching transistor, BFET 2, is turned on (conducting) and the voltage generated at the drain of the eighth switching transistor, BFET 2, is coupled to the battery stack or cells 518 via the battery terminal VBAT 516. The buck-boost converter 530 can be implemented utilizing any suitable buck-boost converter formed on an integrated circuit, wafer, chip or die. For example, in one exemplary embodiment, an ISL9238 buck-boost converter manufactured by Intersil Americas LLC can be utilized to implement the buck-boost converter 530. Note that, for the exemplary embodiment shown, the coordination of the application of the control signals, CTRL1 and CTRL2, is provided by the system involved. For example, in this embodiment, the system connected to the output terminal VSYS 514 transmits a (e.g., charge current) command signal to each one of the boost converter 512 and the buck-boost converter 530 via one or more communication links operated in accordance with the I$^2$C communication protocol. The command signal functions to coordinate the converters' application of the control signals, CTRL1 and CTRL2. Although the I$^2$C communication protocol is utilized to convey the command signals in this exemplary embodiment, any suitable communication link or protocol can be utilized.

Figure 6:
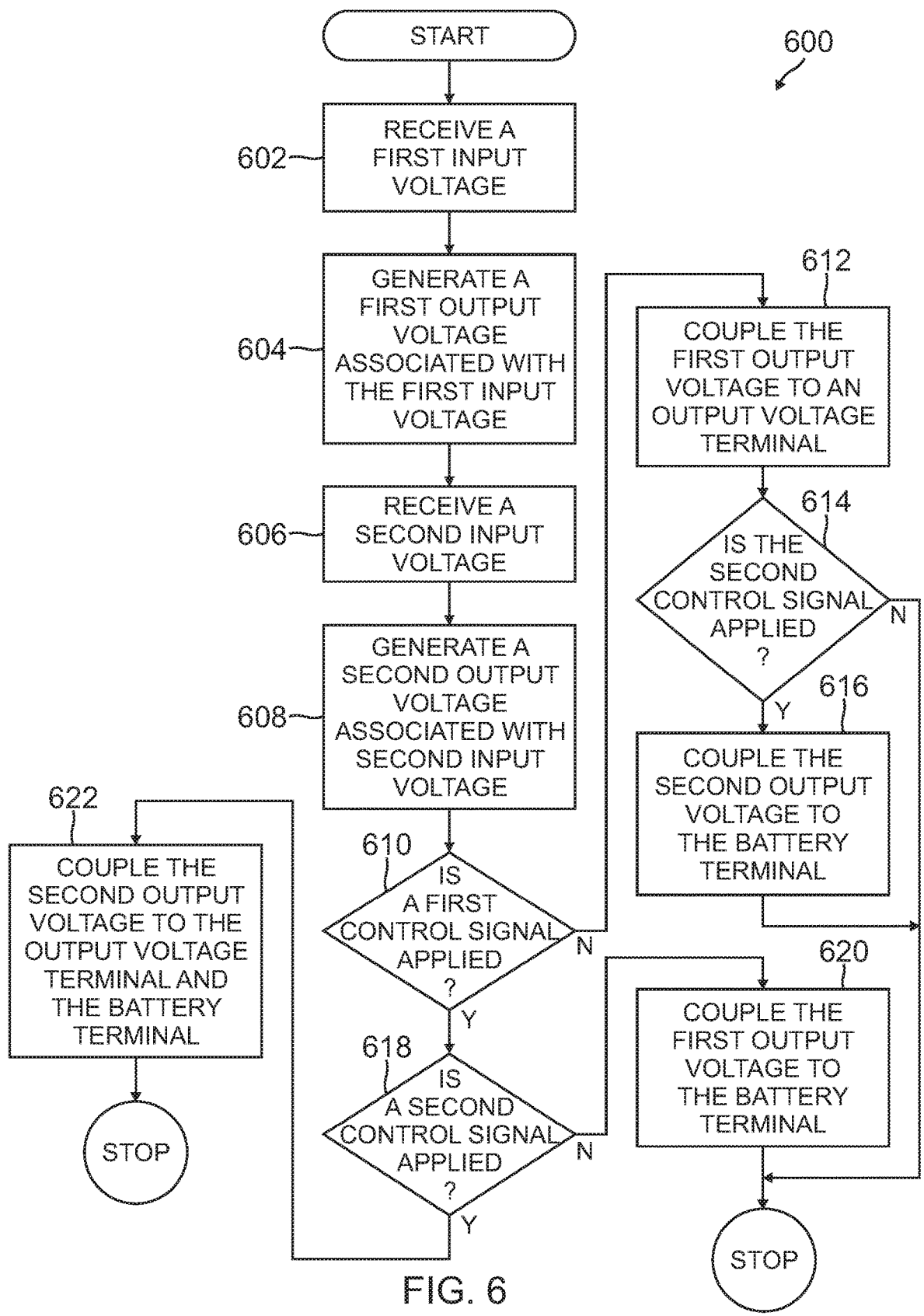
FIG. 6 is a flow diagram of an exemplary method that can be utilized to implement a multiple input, multiple charger configuration, in accordance with one exemplary embodiment of the present invention.

FIG. 6 depicts a flow diagram of an exemplary method 600, which can be utilized to implement a multiple input, multiple charger configuration for powering a system, in accordance with one exemplary embodiment of the present invention. Referring to the flow diagram depicted in FIG. 6 and the exemplary multiple input, multiple charger configuration depicted in FIGS. 1A-1D, the exemplary method 600 begins by receiving a first input voltage, VIN 1, at an input of the first battery charger 102 (602). In response, the first battery charger 102 generates a first output voltage at an output terminal (604). Additionally, a second input voltage, VIN 2, is received at an input of the second battery charger 112 (606). In response, the second battery charger 112 generates a second output voltage at an output terminal (608). The method then determines if the first control signal, CTRL1, is applied to (e.g., level corresponds to an on state of the first transistor switch) the control terminal of the first transistor switch 106 (610). If the first control signal, CTRL 1, is not applied to (e.g., level does not correspond to an on state of the first transistor switch) the control terminal of the first transistor switch 106, the first output voltage is coupled only to the output voltage terminal, VSYS (612). The method then determines if the second control signal, CTRL 2, is applied to (e.g., level corresponds to an on state of the second transistor switch) the control terminal of the second transistor switch 110 (614). If the second control signal, CTRL 2, is applied to the control terminal of the second transistor switch 110, then the output voltage of the second battery charger 112 is coupled to the battery terminal, VBAT 118, to charge the battery stack or cells 108 (616). The flow is then terminated (Stop). Similarly, if (at 614) the second control signal, CTRL 2, is not applied to (e.g., level does not correspond to an on state of the second transistor switch) the control terminal of the second transistor switch 110, the flow is terminated (Stop). Returning to the flow to determine if the first control signal, CTRL1, is applied to the control terminal of the first transistor switch 106 (at 610), if the first control signal, CTRL 1, is applied, then the method further determines if the second control signal, CTRL 2, is also applied to the control terminal of the second transistor switch 110 (618). If the second control signal, CTRL2, is also applied to the control terminal of the second transistor switch 110, the output voltage of the second battery charger 112 is coupled to both the battery terminal, VBAT 118, and the output voltage terminal, VSYS (622). The flow is then terminated (Stop).

Figure 7:
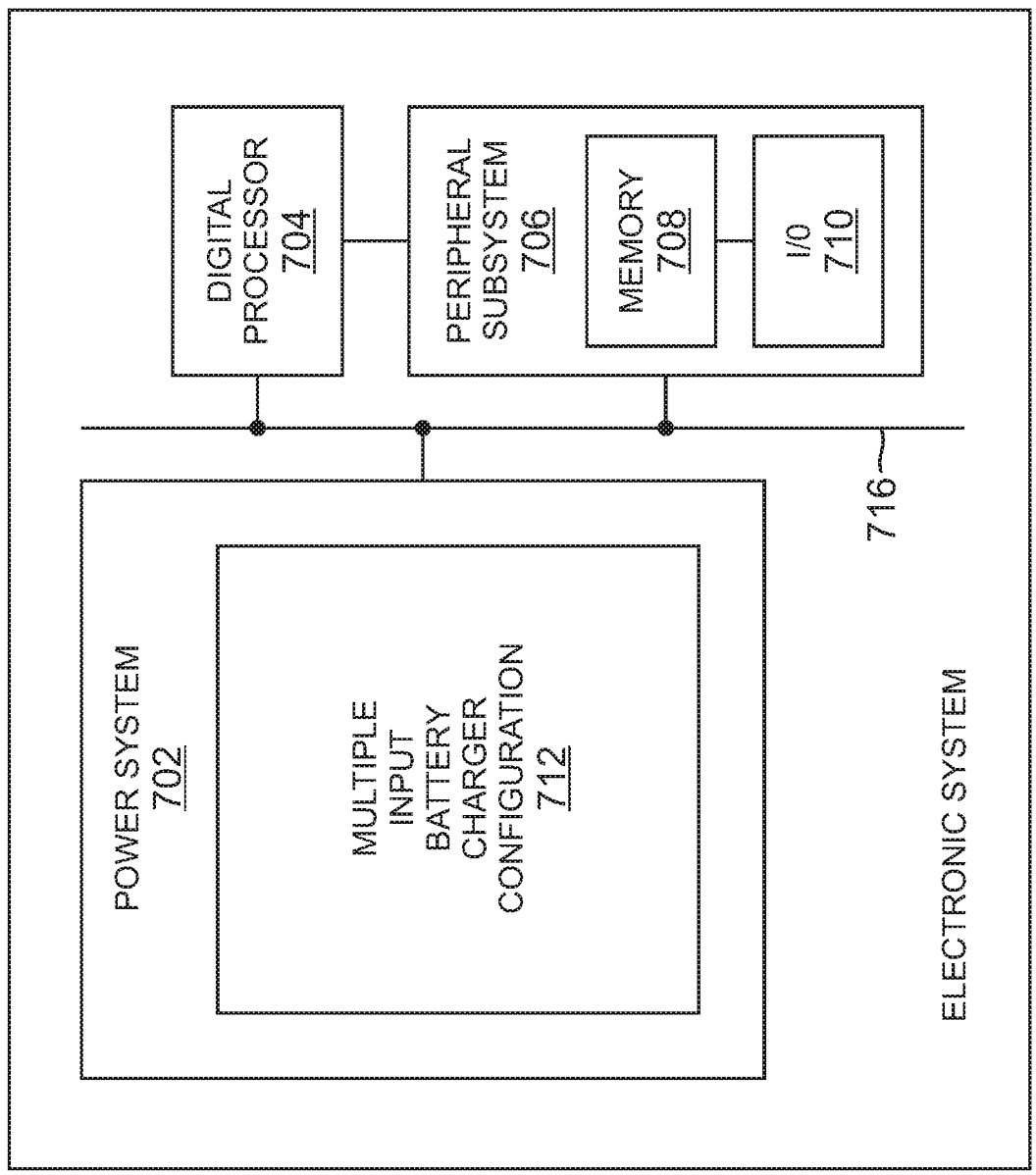
FIG. 7 is a schematic block diagram of an electronic system that can be utilized to implement a multiple input, multiple charger configuration, in accordance with one exemplary embodiment of the present invention.

FIG. 7 is a schematic block diagram of a portable or mobile electronic system 700, which can be utilized to implement a multiple input, multiple charger configuration, in accordance with one exemplary embodiment of the present invention. For example, in some embodiments, one or more of the multiple input, multiple charger configurations described herein can be considered as one or power delivery systems. As such, in the exemplary embodiment shown, the electronic system 700 includes a power system 702, a digital processor unit 704, and a peripheral subsystem 706. For example, the digital processor unit 704 can be a microprocessor or microcontroller and the like. The peripheral subsystem 706 includes a memory unit 708 for storing the data processed by the digital processor unit 704, and an input/output (I/O) unit 710 for transmitting and receiving the data to/from the memory unit 708 and the digital processor unit 704. In the exemplary embodiment depicted in FIG. 7, the power system 702 includes a multiple input, multiple charger configuration 712 that can deliver a voltage to power the system 700, and/or charge a battery stack or cells that can also deliver power to the system 700. The power system 702 provides a regulated (or unregulated) voltage (e.g., VSYS depicted in FIGS. 1A-1D and 2-5) via line 716 to power the electronic components in the digital processor unit 704 and peripheral subsystem 706. In the exemplary embodiment shown, the multiple input, multiple charger configuration 712 can be implemented, for example, utilizing the multiple charger configurations depicted in FIGS. 1A-1D and 2-5. In some embodiments, the components of the electronic system 700 can be implemented in one or more integrated circuits, wafers, chips or dies.

EXAMPLE EMBODIMENTS

Example 1 includes a multiple charger configuration, comprising: a first battery charger circuit configured to receive to a first input voltage; a second battery charger circuit configured to receive a second input voltage; a first switching transistor coupled to an output of the first battery charger circuit, a system voltage output terminal, and a battery terminal configured to connect to a battery stack or at least one battery cell; and a second switching transistor coupled to an output of the second battery charger circuit and the battery terminal.

Example 2 includes the multiple charger configuration of Example 1, wherein the first battery charger circuit is configured to receive the first input voltage on a first USB-C connector, and the second battery charger circuit is configured to receive the second input voltage on a second USB-C connector.

Example 3 includes the multiple charger configuration of any of Examples 1-2, wherein at least one of the first battery charger circuit or the second battery charger circuit is configured to receive one of the first input voltage or the second input voltage on a non-USB-C connector.

Example 4 includes the multiple charger configuration of any of Examples 1-3, wherein the first battery charger circuit includes a first buck-boost converter circuit configured to control switching of the first switching transistor, and the second battery charger circuit includes a second buck-boost converter circuit configured to control switching of the second switching transistor.

Example 5 includes the multiple charger configuration of any of Examples 1-4, wherein the first battery charger circuit includes a buck-boost converter circuit configured to control switching of the first switching transistor, and the second battery charger circuit includes a buck converter circuit configured to control switching of the second switching transistor.

Example 6 includes the multiple charger configuration of any of Examples 1-5, wherein the first battery charger circuit includes a first buck converter circuit configured to control switching of the first switching transistor, and the second battery charger circuit includes a second buck converter circuit configured to control switching of the second switching transistor.

Example 7 includes the multiple charger configuration of any of Examples 4-6, wherein the first buck-boost converter circuit and the second buck-boost converter circuit are formed on a single integrated circuit, wafer, chip or die.

Example 8 includes a power delivery system, comprising: a first battery charger circuit and a second battery charger circuit, wherein the first battery charger circuit is configured to generate a first output voltage responsive to a first input voltage, and the second battery charger circuit is configured to generate a second output voltage responsive to a second input voltage; a battery terminal configured to connect to at least one battery cell, wherein the battery terminal is coupled to the first battery charger circuit via a first switch and to the second battery charger circuit via a second switch; a first DC-DC converter in the first battery charger circuit and coupled to the first switch, wherein the first switch is configured to couple the first output voltage to the battery terminal responsive to a first signal from the first DC-DC converter; and a second DC-DC converter in the second battery charger circuit and coupled to the second switch, wherein the second switch is configured to couple the second output voltage to the battery terminal responsive to a second signal from the second DC-DC converter.

Example 9 includes the power delivery system of Example 8, further comprising a first plurality of switching transistors coupled to one side of a first inductor and the first DC-DC converter, and a second plurality of switching transistors coupled to a second side of the first inductor and the first DC-DC converter.

Example 10 includes the power delivery system of Example 9, further comprising a third plurality of switching transistors coupled to one side of a second inductor and the second DC-DC converter, and a fourth plurality of switching transistors coupled to a second side of the second inductor and the second DC-DC converter.

Example 11 includes the power delivery system of any of Examples 8-10, wherein the first DC-DC converter and the second DC-DC converter are buck-boost converters.

Example 12 includes the power delivery system of any of Examples 8-11, wherein the first DC-DC converter comprises at least one of a buck-boost converter, a buck converter, or a boost converter.

Example 13 includes a method of operation for a multiple input, multiple charger configuration, comprising: receiving a first input voltage at an input of a first charger; generating a first output voltage associated with the first input voltage; receiving a second input voltage at an input of a second charger; generating a second output voltage associated with the second input voltage; determining if a first control signal is applied to a first switch coupled to the first charger, and if so, determining if a second control signal is applied to a second switch coupled to the second charger; and if the second control signal is applied to the second switch, coupling the second output voltage to an output voltage terminal and a battery terminal of the multiple input, multiple charger configuration.

Example 14 includes the method of Example 13, if the first control signal is not applied to the first switch, coupling the first output voltage to the output voltage terminal of the multiple input, multiple charger configuration.

Example 15 includes the method of Example 14, if the first control signal is not applied to the first switch, and the second control signal is applied to the second switch, coupling the second output voltage to the battery terminal of the multiple input, multiple charger configuration.

Example 16 includes the method of Example 15, if the first control signal is applied to the first switch, and the second control signal is not applied to the second switch, coupling the first output voltage to the battery terminal.

Example 17 includes an electronic system, comprising: a digital processor; a peripheral subsystem coupled to the digital processor; and a power system coupled to the digital processor and circuit components of the peripheral subsystem and configured to generate an output voltage to power the digital processor and the circuit components of the peripheral subsystem, wherein the power system includes: a first charger configured to receive a first input voltage; a second charger configured to receive a second input voltage; a first switching transistor coupled to an output of the first charger, a system voltage output terminal, and a battery terminal configured to connect to at least one of a battery, battery stack or battery cell; and a second switching transistor coupled to an output of the second charger and the battery terminal.

Example 18 includes the electronic system of Example 17, wherein the first charger includes at least one of a buck-boost converter or a buck converter formed on an integrated circuit, wafer, chip or die.

Example 19 includes the electronic system of any of Examples 17-18, wherein the second battery charger circuit includes at least one of a buck-boost converter, a buck converter or a boost converter formed on an integrated circuit, wafer, chip or die.

Example 20 includes the electronic system of any of Examples 17-19, wherein the first battery charger circuit includes a first buck-boost converter, the second battery charger circuit includes a second buck-boost converter, and the first buck-boost converter and the second buck-boost converter are formed on a single integrated circuit or chip.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that the present application be limited only by the claims and the equivalents thereof.

What is claimed is:

1. A multiple charger configuration, comprising:
a first battery charger circuit configured to receive a first input voltage and to provide a first output to a system voltage output terminal in response thereto;
a second battery charger circuit configured to receive a second input voltage and to produce a second output in response thereto;
a first switching transistor configured, in response to control by the first battery charger, both to couple the first output of the first battery charger circuit to a battery terminal configured to connect to a battery stack or at least one battery cell and to couple the second output of the second battery charger circuit to the system voltage output terminal; and
a second switching transistor configured, in response to control by the second battery charger, to couple the second output of the second battery charger circuit to the battery terminal.

2. The multiple charger configuration of claim 1, wherein the first battery charger circuit is configured to receive the first input voltage on a first USB-C connector, and the second battery charger circuit is configured to receive the second input voltage on a second USB-C connector.

3. The multiple charger configuration of claim 1, wherein at least one of the first battery charger circuit or the second battery charger circuit is configured to receive one of the first input voltage or the second input voltage on a non-USB-C connector.

4. The multiple charger configuration of claim 1, wherein the first battery charger circuit includes a first buck-boost converter circuit configured to control switching of the first switching transistor, and the second battery charger circuit includes a second buck-boost converter circuit configured to control switching of the second switching transistor.

5. The multiple charger configuration of claim 1, wherein the first battery charger circuit includes a buck-boost converter circuit configured to control switching of the first switching transistor, and the second battery charger circuit includes a buck converter circuit configured to control switching of the second switching transistor.

6. The multiple charger configuration of claim 1, wherein the first battery charger circuit includes a first buck converter circuit configured to control switching of the first switching transistor, and the second battery charger circuit includes a second buck converter circuit configured to control switching of the second switching transistor.

7. The multiple charger configuration of claim 4, wherein the first buck-boost converter circuit and the second buck-boost converter circuit are formed on a single integrated circuit, wafer, chip or die.

8. A power delivery system, comprising:
a first battery charger circuit and a second battery charger circuit, wherein the first battery charger circuit is configured to generate a first output voltage responsive to a first input voltage, and the second battery charger circuit is configured to generate a second output voltage responsive to a second input voltage;
a battery terminal configured to connect to at least one battery cell, wherein the battery terminal is coupled to the first battery charger circuit via a first switch and to the second battery charger circuit via a second switch;
a first DC-DC converter in the first battery charger circuit and coupled to the first switch, the first DC-DC converter being configured to generate the first output voltage from the first input voltage and provide the generated first output voltage to a first output terminal connected to a first output capacitor, wherein the first switch is configured to couple the first output voltage from the first output terminal to the battery terminal responsive to a first signal from the first DC-DC converter; and
a second DC-DC converter in the second battery charger circuit and coupled to the second switch, the second DC-DC converter being configured to generate the second output voltage from the second input voltage and provide the generated second output voltage to a second output terminal connected to a second output capacitor, wherein the second switch is configured to couple the second output voltage to the battery terminal responsive to a second signal from the second DC-DC converter, and
wherein the first switch is configured to further couple the second output voltage to the first output terminal responsive to the second signal from the second DC-DC converter and a third signal from the first DC-DC converter.

9. The power delivery system of claim 8, wherein the first battery charger circuit includes a first plurality of switching transistors coupled to one side of a first inductor and the first DC-DC converter, and a second plurality of switching transistors coupled to a second side of the first inductor and the first DC-DC converter.

10. The power delivery system of claim 9, wherein the second battery charger circuit includes a third plurality of switching transistors coupled to one side of a second inductor and the second DC-DC converter, and a fourth plurality of switching transistors coupled to a second side of the second inductor and the second DC-DC converter.

11. The power delivery system of claim 8, wherein the first DC-DC converter and the second DC-DC converter are buck-boost converters.

12. The power delivery system of claim 8, wherein the first DC-DC converter comprises at least one of a buck-boost converter, a buck converter, or a boost converter.

13. A method of operation for a multiple input, multiple charger configuration, comprising:
receiving a first input voltage at an input of a first charger;
generating a first output voltage associated with the first input voltage;
receiving a second input voltage at an input of a second charger;
generating a second output voltage associated with the second input voltage;
determining if a first control signal from the first charger is applied to a first switch coupled to the first charger, and if so, determining if a second control signal from the second charger is applied to a second switch coupled to the second charger; and
if the second control signal is applied to the second switch while the first control signal is applied to the first switch, coupling the second output voltage both to an output voltage terminal of the multiple input, multiple charger configuration via both of the first and second switches and a battery terminal via only the second switch.

14. The method of claim 13, if the first control signal is not applied to the first switch, coupling the first output voltage to the output voltage terminal of the multiple input, multiple charger configuration.

15. The method of claim 14, if the first control signal is not applied to the first switch, and the second control signal is applied to the second switch, coupling the second output voltage to the battery terminal of the multiple input, multiple charger configuration.

16. The method of claim 15, if the first control signal is applied to the first switch, and the second control signal is not applied to the second switch, coupling the first output voltage to the battery terminal.

17. An electronic system, comprising:
a digital processor;
a peripheral subsystem coupled to the digital processor; and
a power system coupled to the digital processor and circuit components of the peripheral subsystem and configured to generate an output voltage to power the digital processor and the circuit components of the peripheral subsystem, wherein the power system includes:
a first charger configured to receive a first input voltage and to provide a first output to a system voltage output terminal;
a second charger configured to receive a second input voltage and to produce a second output in response thereto;
a first switching transistor configured, in response to control by the first battery charger, both to couple the first output of the first charger to a battery terminal configured to connect to at least one of a battery, battery stack or battery cell and to couple the second output of the second charger to the system voltage output terminal; and
a second switching transistor configured, in response to control by the first battery charger, to couple the second output of the second charger to the battery terminal.

18. The electronic system of claim 17, wherein the first charger includes at least one of a buck-boost converter or a buck converter formed on an integrated circuit, wafer, chip or die.

19. The electronic system of claim 17, wherein the second charger circuit includes at least one of a buck-boost converter, a buck converter or a boost converter formed on an integrated circuit, wafer, chip or die.

20. The electronic system of claim 17, wherein the first charger circuit includes a first buck-boost converter, the second charger circuit includes a second buck-boost converter, and the first buck-boost converter and the second buck-boost converter are formed on a single integrated circuit or chip.

* * * * *